United States Patent Office 3,741,970
Patented June 26, 1973

3,741,970
LINEAR ALKYL-AMIDO TRANS-QUINACRIDONE PIGMENTS
Otto Fuchs, Frankfurt am Main, Germany, assignor to Farbwerke Hoechst Aktiengesellschaft vormals Meister Lucius & Bruning, Frankfurt am Main, Germany
No Drawing. Filed Dec. 3, 1970, Ser. No. 94,963
Claims priority, application Germany, Dec. 4, 1969, P 19 60 897.0
Int. Cl. C07d 39/00
U.S. Cl. 260—279 R                    4 Claims

ABSTRACT OF THE DISCLOSURE

Linear trans-quinacridones of the general formula

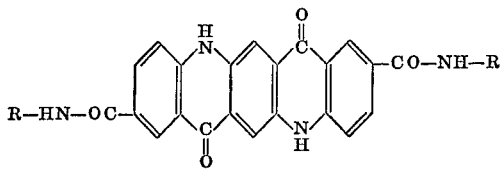

wherein R is ethyl, n-butyl or n-hexyl and process for preparing them. Said pigments have pure bluish red violet shades and are excellently suited for getting pigments of neutral red shades by mixing them with molybdate orange.

---

In the series of the linear trans-quinacridones there may be prepared pigments reaching from orange over red to violet. Some of them have become very important on industrial scale on account of the brilliance of their shades and their excellent fastness properties. The most bluish shade is obtained by the unsubstituted quinacridone in form of its β-modification.

When mixed with molybdate orange in different proportions, the bluish red pigments of the quinacridone series are suitable for the preparation of neutral red shades. The brightness of these red shades depends on the purity of the molybdate orange shade and of the organic pigment used. It is therefore important from the industrial aspect that, if possible, pure shades and intense bluish red violet pigments be prepared.

Neither in the series of the quinacridone pigments nor in any other series of organic pigments a product has hitherto been known which yields a pure but more blue shade than the β-modification, the fastness properties being at least the same. Furthermore it is not possible to prepare said shade by using a pigment already known or by mixing various known pigments, since in all pigments hitherto known which provide in appropriate mixture a bluish red violet shade, the purity of the shade and the fastness properties are not sufficient.

It has now been found that very pure new quinacridone pigments, more blue and more pure than the β-modification, of the general formula

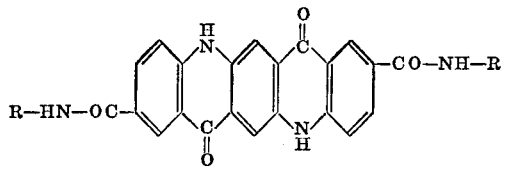

wherein R is ethyl, n-butyl or n-hexyl, may be obtained, when treating 2,5-diarylamino-terephthalic acids or their esters having the general formula

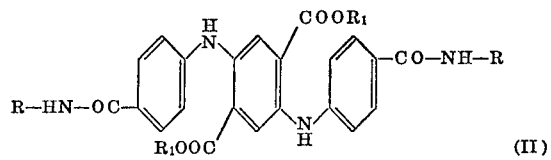

in which $R_1$ stands for a hydrogen atom or an alkyl group with 1 to 4 carbon atoms, preferably for a methyl or ethyl radical, and R is defined as above, at elevated temperature with ring closing agents.

This result was surprising and not foreseeable, because linear quinacridones having the groups —CONHR in the same position, in which R represents a hydrogen atom or any alkyl group desired except the ethyl, n-butyl and n-hexyl group, yield a very reddish shade and have a more intense red color than the β-modification. Only if R stands for an ethyl, n-butyl and n-hexyl radical, the desired very bluish shade, obtained.

The starting compounds of the above Formula II employed in the present process may be prepared in analogous way as the known dianilinoterephthalic acid derivatives, for example by condensation of succinylosuccinic acid esters with p-aminobenzoic acid amides, subsequent oxydation and, if desired, saponification.

Depending on the ring closing agent, the ring closure reaction is generally carried out at temperatures between about 100° and 250° C. As examples for ring closing agents there may be mentioned boric acid (H. Liebermann, Liebigs Annalen der Chemie 518 (1935), pages 245–259), anhydrous hydrofluoric acid (French patent specification No. 1,245,971), metal halides, especially aluminum chloride (French patent specification No. 1,253,985) and polyphosphoric acid (German patent specification No. 1,112,597).

In the present process there is preferably used sulfuric acid as ring closing agent, expediently in a concentration between about 88 and 95%, preferably between about 92 and 94%.

The reaction is expediently started by introducing the corresponding 2,5-diarylaminoterephthalic acid derivative into 5 to 15 times the amount of sulfuric acid of the mentioned concentration and by heating slowly up to temperatures between 110°–150° C., preferably between 120° to 135° and by maintaining the whole at the chosen temperature, until a sample hydrolized with water does not show any trace of the starting material. The reaction mixture is then slowly poured onto ice, the precipitated red deposit is filtered off and washed until neutral.

By this method the linear quinacridone is obtained in a practically quantitative yield having a very pure form and an extremely fine division.

The use of sulfuric acid in different concentrations as ring closing agent is known. However, neither the unsubstituted quinacridone nor the substituted quinacridones hitherto known may be closed to a ring in sulfuric acid without getting by-products, since sulfonation is already observed under the reaction conditions and the sulfo groups introduced cannot eaily be split off. Thus, products sufficiently pure for being employed as pigments cannot be obtained. Therefore it was surprising that in the present invention not only the sulfonation but also the saponification of the carboxylic acid alkyl amide group were missing under the reaction conditions.

The quinacridones obtained as described above are very pure, but they may generally not be used as pigments in this form since they do not yet possess the best physical properties for pigments. The conversion of these products into a coloristically valuable pigment form is effected in known manner.

The conversion into this form may for example be carried out by heating for several hours the moist press-cake in water without additives or with addition of an appropriate solvent under pressure up to temperatures of 100°–200° C., preferably of 120°–180° C., by filtering after cooling to room temperature, by freeing the moist press-cake from the organic substance by washing or distillation with steam, by drying and, if desired, grinding in an appropriate grinding device (U.S. patent specification No. 3,256,285).

When using solvents, the boiling point of which ranges above 100° C., the water may be distilled off after mixing with the organic substance, then heated at normal pressure up to the mentioned temperatures and worked up as described above.

As substances which cause the conversion into the best pigment form, there are considered the substances cited for example in the German patent specifications Nos. 1,196,619, 1,268,586 and U.S. Pat. No. 3,256,285; however, in the process according to the invention there may also be used hydrocarbons, halogen and nitro-substituted hydrocarbons and substances insoluble or sparingly soluble in water.

The conversion of the quinacridones obtained according to the invention into a coloristically valuable pigment form is preferably carried out according to the above-mentioned processes, since it is possible in this case to start from the aqueous moist press-cake. The conversion may also be effected by grinding the dried product in the presence of water-soluble inorganic salts such as sodium chloride or sodium sulfate; small amounts of organic solvents are added, if desired (U.S. patent specification No. 2,821,530). It is also possible to grind the quinacridone in a roller type grinder and to knead the preliminarily ground product with 4 to 10 times the amount by weight of an organic solvent such as acetone, dimethylformamide or tetrachloroethylene (U.S. patent specification No. 2,857,400).

According to the described process very intense bluish red violet crystal powders are obtained which are characterized by their fastness properties, above all fastness to bleeding, excellent fastness to light and weathering and by the brilliance of their shade. As to the fastness to light and weathering they are comparable to the fastest pigments of the series of the linear quinacridones. However, their shade is much more bluish than the shade of the β-modification of the unsubstituted quinacridone. Moreover, the quinacridone pigments according to the invention are superior to said β-modification regarding the fastness to light and to weathering. They are eminently suitable for the preparation of neutral red shades by mixing with molybdate orange. Neither by using another organic pigment nor by mixing different pigments can these shades be obtained in such a degree of purity and with comparable good fastness properties. A further advantage consists in the fact that the new quinacridone pigments are obtained in a form which is exactly reproducible without difficulty as to the shade and which, therefore, is distinguished in favorable manner from the unsubstituted quinacridone in the β-modification.

The new quinacridone pigments according to the invention are eminently suitable especially for being incorporated into lacquers, printing inks and plastic masses, such as polyvinylchloride.

The following examples serve to illustrate the invention. Parts and percentages are by weight unless stated otherwise.

EXAMPLE 1

30 parts of 2,5-di-(4' - N - ethylcarbonamido-phenylamino)-terephthalic acid were introduced while stirring into 300 parts of 92% sulfuric acid, the whole was slowly heated to 130–135° C. and maintained at this temperature for about one hour. The hot reaction mixture was then poured while stirring onto 3000 parts of ice, and the precipitated red reaction product was suction-filtered and washed until neutral. For removing traces of the starting material the filtered material was heated for a short time with 300 parts of 1% soda solution, suction-filtered and washed until neutral. The moist press-cake was then introduced into 300 parts of dimethylformamide and heated until the water was removed from the stirring vessel. Subsequently the product was heated up to 150° C. and maintained at this temperature for 5 hours. After cooling to 50° C., the product was suction-filtered, the residue was washed with methanol, dried and powdered. 26.5 parts of a red violet powder were obtained which yielded in the enamel an intense bluish red violet shade of high purity and provided in a mixture with molybdate orange pure red shade.

The same results were obtained when the dimethylformamide was replaced by equal parts of N-methylacetamide, dimethylacetamide, N-methylpyrrolidone, butyrolactone, ε-caprolactam, dimethylsulfoxide, phenol, aniline, quinoline, benzoic acid methyl ester or nitrobenzene.

EXAMPLE 2

50 parts of 2,5-di-(4'-N-n-butylcarbonamido-phenylamino)-terephthalic acid were mixed at 85°–100° C. in 500 parts of polyphosphoric acid having a content of 84% of $P_2O_5$. The whole was heated up to 125° C. and this temperature was maintained for one hour. After cooling to 100° C. the product was poured while stirring onto a mixture of 800 parts of ice and 700 parts of water, then the precipitated deposit was suction-filtered and washed until neutral. The filtered product was boiled under reflux for half an hour with 200 parts of a 0.5% soda solution, suction-filtered while hot and washed until neutral. The conversion into the pigment form was effected according to the operation method described in Example 1. 45 parts of a pigment powder were obtained which, when incorporated in polyvinylchloride, showed an intense bluish red violet shade and an excellent fastness to bleeding.

When the 2,5-(4'-N-n-butylcarbonamido-phenylamino)-terephthalic acid was replaced by the corresponding N-n-hexyl derivative and the further reaction was carried out as mentioned above, a pigment powder was obtained in an equally good yield which provides, when incorporated into a lacquer or polyvinylchloride, a similar shade as the products of the Examples 1 and 2.

EXAMPLE 3

30 parts of 2,5-di(4'-N-ethylcarbonamido-phenylamino)-terephthalic acid diethyl ester were introduced by stirring into 300 parts of 94% sulfuric acid, the whole was slowly heated to 130°–135° C. and maintained at this temperature for one hour. After cooling to 100° C. the reaction mixture was poured onto 500 parts of ice and 200 parts of water, suction-filtered and washed until neutral. The crude product thus-obtained was processed according to the method described in Example 1. By this way 23.5 parts of a pigment powder was obtained which exhibited the same properties as the powder described in Example 1.

EXAMPLE 4

The crude quinacridones in the form of their moist press-cakes prepared according to the Examples 1 or 2 by ring closure in sulfuric acid or in polyphosphoric acid and by subsequent extraction with diluted soda solution were heated with 10 times the amount of ethyl alcohol (calculated on the solids content) in a pressure vessel for 5 hours up to 150°–180° C. After cooling, the product was suction-filtered, washed with water, dried and ground. Pigments were obtained which provided, when incorporated in a printing ink, a lacquer or plastic materials, intense bluish red violet shades and excellent fastness properties.

Instead of ethyl alcohol, other alcohols such as methanol, propanol, isopropanol, butanol, methylglycol, ethylglycol, butylglycol, ethyldiglycol or substances as mentioned in Example 1 may be used.

I claim:

1. A linear trans-quinacridone of the formula

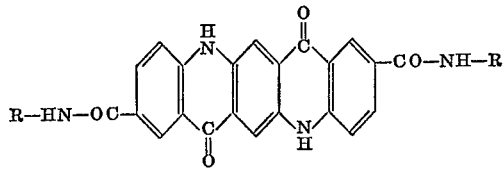

wherein R is ethyl, n-butyl or n-hexyl.

2. A compound according to claim 1 wherein R is ethyl.

3. A compound according to claim 1 wherein R is n-butyl.

4. A compound according to claim 1 wherein R is n-hexyl.

References Cited

UNITED STATES PATENTS

| | | | |
|---|---|---|---|
| 3,686,009 | 8/1922 | West | 260—279 R |
| 3,045,040 | 7/1962 | Deuschel | 260—279 X |
| 3,165,524 | 1/1965 | Schumacher et al. | 260—279 |
| 3,200,122 | 8/1965 | Streiff | 260—279 |
| 3,261,837 | 7/1966 | Bohlen | 260—279 |
| 3,264,298 | 8/1966 | Berry et al. | 260—279 |
| 3,530,136 | 9/1970 | Hsia et al. | 260—279 |

FOREIGN PATENTS

| | | | |
|---|---|---|---|
| 44-22,418 | 9/1969 | Japan | 260—279 |
| 419,395 | 3/1967 | Switzerland | 260—279 |

DONALD G. DAUS, Primary Examiner

U.S. Cl. X.R.

106—288 Q; 260—471 R